United States Patent [19]
Roberts

[11] 3,846,053
[45] Nov. 5, 1974

[54] ROTARY INTERNAL COMBUSTION ENGINE HAVING DYNAMIC FLUID SEALS

[76] Inventor: Stanley Roberts, 36 Skyline Ter., Spring Valley, N.Y. 10977

[22] Filed: July 16, 1973

[21] Appl. No.: 379,739

[52] U.S. Cl.............. 418/94, 123/8.01, 123/26, 418/113, 277/DIG. 1
[51] Int. Cl........................ F01c 19/00, F04c 27/00
[58] Field of Search......... 123/8.01; 418/91, 92, 94, 418/100, 104, 112, 113, 124, 183, 188, 61 A; 277/DIG. 1, DIG. 5; 308/DIG. 1

[56] References Cited
UNITED STATES PATENTS
3,752,607  8/1973  Bilobran .................... 418/124

FOREIGN PATENTS OR APPLICATIONS
2,014,181  10/1970  Germany ................. 418/91
943,693    12/1963  Great Britain .......... 418/100

Primary Examiner—William L. Freeh
Assistant Examiner—Michael Koczo, Jr.
Attorney, Agent, or Firm—Philip G. Hilbert

[57] ABSTRACT

A rotary internal combustion engine which is provided with a fluid dynamic seal for confining the combustion gases of very high temperature and pressure to a given region. The fluid seal can be used in lieu of mechanical seals and/or can be used in conjunction with mechanical seals to improve their performance and to improve the combustion efficiency of the rotary engine.

9 Claims, 7 Drawing Figures

ROTARY INTERNAL COMBUSTION ENGINE HAVING DYNAMIC FLUID SEALS

PROBLEM AND PRIOR ART

In rotary type combustion engines, e.g., a Wankel type engine, there is presented a serious problem of sealing between the apex of the rotor and the inner surface of the epitrochoid housing. Heretofore this sealing was effected by mechanical type seals or blades. However such seals are subject to excessive wear and/or replacement. For this reason they have not achieved the reliability of the piston rings used in conventional piston type internal combustion engines. Also the lubrication of mechanical seals currently in use in such rotary engine has presented additional problems. As the seals of such rotary engines can not be bathed in lubricating oil, the lubrication thereof must be achieved either by mixing lubricating oil with the gas or by incorporating in the engine a relatively complex lubricant injecting system.

Another noted problem which has been attributed to the current mechanical sealing problem of the rotary engine is that of relatively poor fuel economy. Poor fuel economy resulted because of incomplete combustion and the tendency for the fuel-air mixture to leak past the mechanical seals.

Another recognized problem of the rotary engine is that of sustained uneven heating of the housing. This results from the sections near the intake port remaining relatively cool as it is exposed to relatively cool incoming fuel-air mixture whereas the portion of the housing adjacent the spark plugs is constantly heated by the combustion of fuel.

Some difficulty has also been encountered with respect to the polutant emission of said rotary engine. Due to the inherent operations of the currently known rotary engines, the troublesome polutants which are released comprise unburned hydrocarbons and the nitrogen oxides. The relatively high release of the unburned hydrocarbons is generally attributed to a large extent to the ineffective sealing. The nitrous oxide emissions are attributed to high operating temperatures. While the nitrous oxide emissions of the rotary engine are generally not as severe as those resulting from the conventional piston type internal combustion engines, it is nevertheless a problem of considerable concern in this day and age.

OBJECTS

An object of this invention is to provide a rotary engine with a fluid dynamic seal so as to minimize seal wear and/or replacement.

Another object is to provide a rotary engine with a supersonic fluid seal.

Another object is to provide for more uniformly controlling the housing temperature of a rotary internal combustion engine.

Another object is to provide a rotary engine with improved means of lubrication.

Another object is to provide a rotary engine with a fluid dynamic seal which may be utilized with or without mechanical seals.

Another object is to provide a rotary engine in which the fuel economy is enhanced, and in which the polutent emissions are noticeably reduced.

Another object is to provide a rotary internal combution engine which is relatively simple in construction and positive in operation.

BRIEF SUMMARY OF THE INVENTION

This invention is directed to a rotary internal combution engine which comprises a housing and a rotor. The rotor is provided with circumferentially spaced apex portions which with the housing define the operating chambers of the engine in which the fuel-air mixture is successively received, compressed, ignited, expanded and exhausted to define the engine operating cycle. In accordance with this invention the rotor is provided with a plenum chamber which communicates with nozzles formed at the apex portions of the rotor. A fluid injector is operatively connected to the plenum chamber for pressurizing the fluid in the plenum so as to generate supersonic velocities through the respective nozzles to form a fluid dynamic seal between the rotor and the housing. The fluid defining the seals may comprise air or a mixture of air and lubricating oil. The nozzles that are inclined in the direction of rotor rotation are inclined relative to the inner wall of the housing rotor chamber at an angle which is greater than the leaning angle, i.e., the angle defined by a radius of the rotor and a line normal to the housing chamber and less than 90°.

FEATURES

A feature of this invention resides in the provision of supersonic fluid seals at the apex of the rotor to confine the operating gases to their respective operating chambers.

Another feature resides in the provision wherein the fluid defining the fluid seals further functions as a coolant for reducing engine temperature and thereby minimizes the problem of sustained uneven heating of the engine housing.

Another feature resides in the provision that the cooling effect which the sealing fluid has on the operating temperature of the engine results in a decrease of the undesirable nitrous oxide constituents present in the combustion gases exhausted.

Another feature resides in the provision wherein the sealing fluid when comprising air provides a source for secondary air which enhances the combustion of any unburned hydrocarbons to thereby enhance the fuel economy of such engines.

Another feature of this invention is that the fluid seals may be used with or without the mechanical seals now conventionally used in such engines.

Other features and advantages will become more readily apparent when considered in view of the drawings and specification in which.

DETAILED DESCRIPTION

This invention is directed to a rotary engine having improved sealing means for confining the operating gases, e.g., air-fuel mixtures, and the combustion gases to a given region or operating chambers to result in improved fuel economy and improved combustion efficiency. For the purpose of this description, reference will be made to a rotary engine of a type commonly referred to as a Wankel type internal combustion engine. However, it will be understood that the invention to be described can be readily applied to other types of rotary engines in which a rotor is rotatably journalled within a stator housing.

Figure 1:
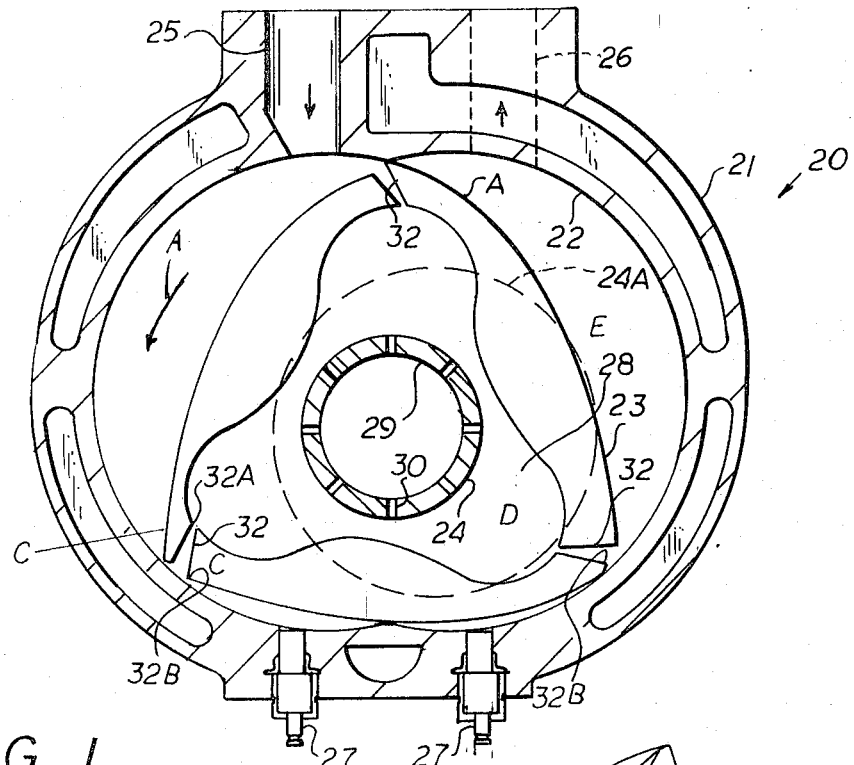
FIG. 1 is a diagrammatic sectional view of a rotary engine embodying the present invention.
Figure 7:
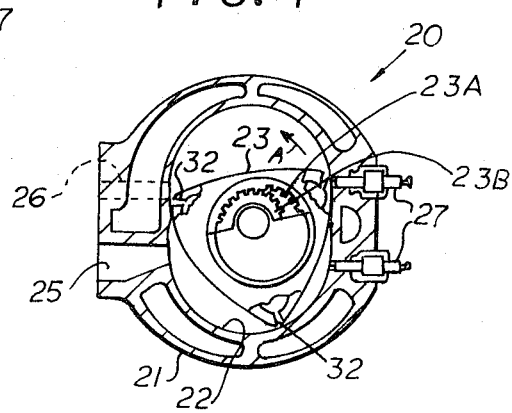
FIG. 7 is a sectional assembly view of a rotary engine embodying this invention.

In the illustrated embodiment of FIG. 1 and 7, the rotary engine 20 comprises a housing 21 which may be either liquid cooled or air cooled as is well known in the art. The engine housing 21 is provided with a rotor chamber 22, which in the illustrated form of the invention, is defined as a two-lobe epitrochoid. A triangular rotor 23 is rotatably journalled within the housing 21. As shown, the rotor 23 comprises a generally triangularly shaped rotor having circumferentially spaced apexes A, B and C. Rotation of the rotor 23 as indicated by arrow A thus defines three chambers of varying volumes, each of which undergoes a complete four stroke Otto cycle upon each revolution. It will be understood that to maintain the rotor 23 in proper orientation with the housing, the rotor 23 is provided with an internal gear 23A which meshes with a gear 23B which is fixed to the housing.

A shaft 24 with an eccentric 24A supports the rotor 23 within the housing and provides the means whereby the torque is transmitted to a crankshaft.

The housing as seen in FIG. 1 is provided with a suitable fuel-air intake port 25 and exhaust port 26. Ignition of the fuel-air mixture is effected by suitable spark plugs 27 located in the area of compression as indicated in FIG. 1.

Figure 3:
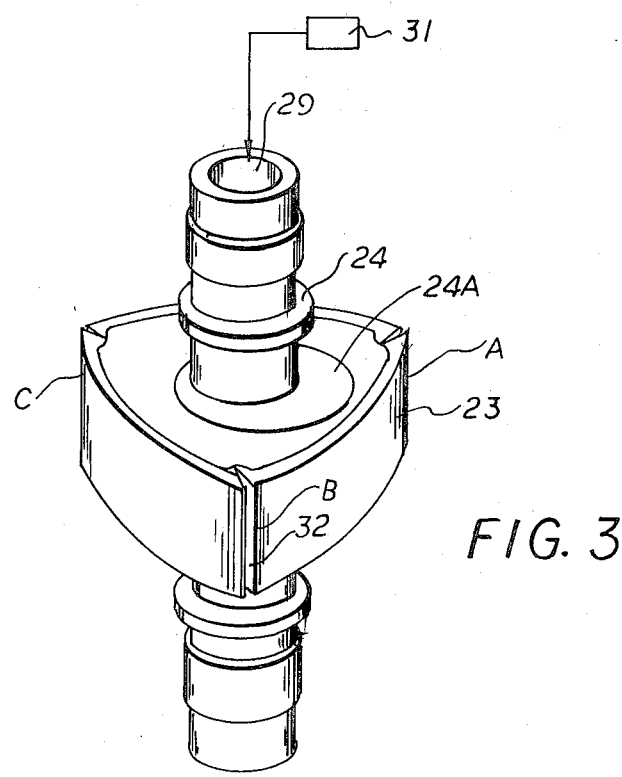
FIG. 3 is a detailed perspective view of a rotor embodying the invention.

In accordance with this invention the sealing means located at the respective apexes of the rotor comprises a fluid dynamic seal. As best seen in FIG. 1, the rotor 23 is provided with an internal plenum chamber 28 which is connected in communication to the bore 29 of the rotor shaft 23 by means of a plurality of radially extending ports 30 formed at the hub portion of the shaft. A fluid injector 31 as illustrated in FIG. 3, is connected to the rotor shaft 24 for introducing a sealing fluid as for example, compressed air, into the bore 29 of the rotor shaft 24. It will be understood that the injector means 31 may comprise a suitable pumping means capable of injecting a suitable fluid, e.g., compressed air, or a mixture of compressed air and lubricating oil in an aerosol mixture as will be herein described into the rotor bore 29 and connected rotor plenum chamber 28.

Figure 2:
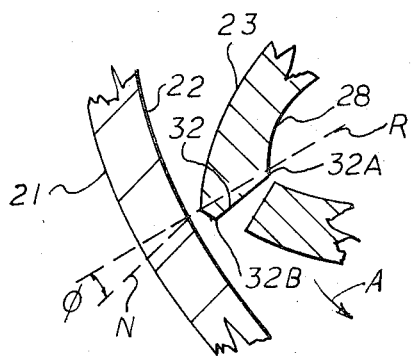
FIG. 2 is an enlarged fragmentary sectional view illustrating the fluid sealing detail of this invention.
Figure 6:
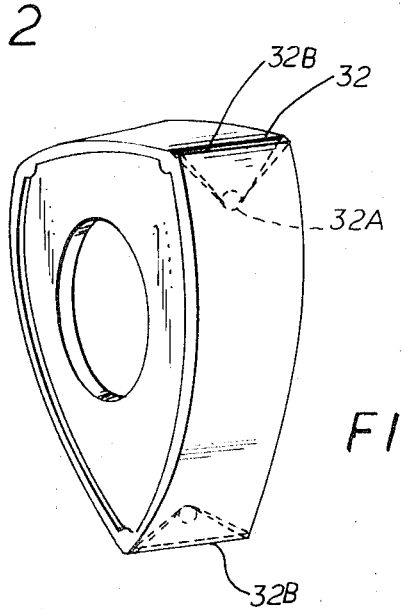
FIG. 6 is a detailed perspective view of a rotor embodying the fluid seal means of this invention.

Formed in the region of the respective apexes of the rotor 23 is a convergent-divergent nozzle 32. As best seen in FIGS. 1, 2 and 6, the throat 32A of the nozzle is disposed in communication with the plenum chamber 28 of the rotor 23. The nozzle exit area 32B is directed toward the inner surface 22 of the epictrochoidal chamber. The nozzles 32 adjacent the respective apex, A, B or C, of the rotor 23 is arranged for directing the sealing fluid at supersonic velocity against the internal surface 22 of the epitrochoidal surface. The angle of inclination of the nozzle 32 is such that it is greater than the leaning angle $\phi$ and less than 90 degrees where the leaning angle is defined as the angle $\phi$ formed by the radius R of the rotor 23 and a line N normal to the engine housing 21 as indicated in FIG. 2. The arrangement is such that the sealing fluid is ejected from the apex nozzle 32 in a non-radial direction. The design of the nozzles is such that the velocity of the sealing fluid at the maximum gap size between the rotor apex and the inner epitrochoidal wall 22 is at least supersonic. The direction of the high velocity fluid flow exiting the respective apex nozzles 32 will be such so as to directly impinge upon the inner epitrochoidal surface to prohibit any leakage of the operating gases about the apex of the rotor 23 during an operating cycle.

As seen in FIGS. 1 and 2 the fluid sealing means of the rotor 23 are constructed and arranged so as to operate completely free of any mechanical apex seal means, thus obviating the wear and/or replacement of mechanical seals as hereinbefore was required. While the fluid seals described may be used in place of mechanical seals it will be understood that the fluid seal described with respect to FIGS. 1 and 2 may be utilized, if so desired, in conjunction with mechanical apex seals. When the fluid seal means herein described is utilized with mechanical apex seal means, it will be understood that the mechanical seal may function either as a baffle either behind the fluid seal, or as a baffle between two high velocity fluid flows emanating from a given apex area of the rotor, or as a baffle in front of the high velocity fluid seal.

Figure 4:
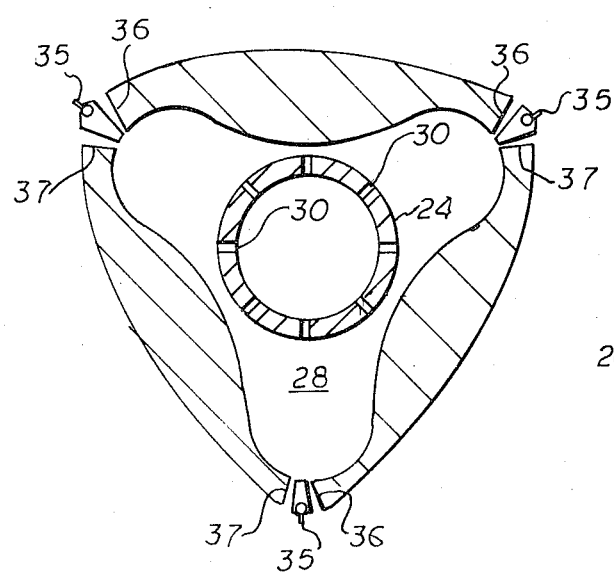
FIG. 4 is a diagrammatic view of another embodiment of the invention.

As illustrated in FIG. 4, it will be noted that the arrangement disclosed therein, is similar to that described with respect to FIG. 1 with the exception that a mechanical seal 35 is disposed between two high velicity fluid seals defined by similarly constructed nozzles 36 and 37. The mechanical seal 35 of conventional or well known constructions is disposed between a pair of adjacent nozzles 36, 37. The nozzles 36, 37 are disposed in communication with the rotor plenum chamber 28 and are generally constructed as hereinbefore described with respect to FIGS. 1 and 2.

With the construction described with respect to FIG. 4, lubrication of the mechanical seals 35 can be effected by including in the working fluid or air being introduced into the rotor plenum chamber 28 a lubricating oil. Accordingly, the working fluid and lubricating oil mixture emanating through the respective nozzle 36, 37 during the engine operation creates an aerosol type mixture which functions to lubricate the mechanical seal 35. Also the flow of working fluid through the nozzles 36 and 37 functions to effect a cooling effect on the mechanical seal.

The mass rate of flow of the working or sealing fluid flowing through the rotor 23 and into the housing chamber 22 may be variably controlled in a manner so as to be apportioned to the mass rate of fuel and air intake. For example, the amount of working fluid or air introduced into the housing through the rotor nozzles may comprise 90 percent of the mass rate of fuel and air intake.

The temperature and pressures of the working or sealing fluid at the nozzle exits may be controlled by the nozzle area ratio which is within the constraints of the plenum pressure and temperature, and the ambient combustion chamber pressure and temperatures which vary throughout the combustion cycle.

With the construction described it will be apparent that the fluid seal when used in place of mechanical seals virtually eliminates the problems involving mechanical seal wear and/or replacement. Also by having a working or sealing fluid of lower temperature than the combustion gases flowing through the respective seal nozzles, the sealing fluid further functions to temper the high combustion gases thereby tending to reduce the high operating engine temperatures. By so doing the formation of objectionable nitrous oxide constituents of the combustion gas being emitted by the engine can be reduced substantially. Also by controlling the composition of the working or sealing fluid emanating from the rotor nozzles with respect to the proportional fuel-air intake gases, a more complete combustion of the hydrocarbon can be effected in that the sealing fluid or compressed air forms a source of secondary air to further enhance or complete the combustion of any unburned hydrocarbon fuel particles.

When the sealing fluid is utilized in conjunction with mechanical seals, as hereinbefore described, the high velocity sealing fluids provide the vehicle whereby lubricating oils mixed therewith can be aerosoled to effect the lubrication of the mechanical seals in a simple and expedient manner.

Figure 5:
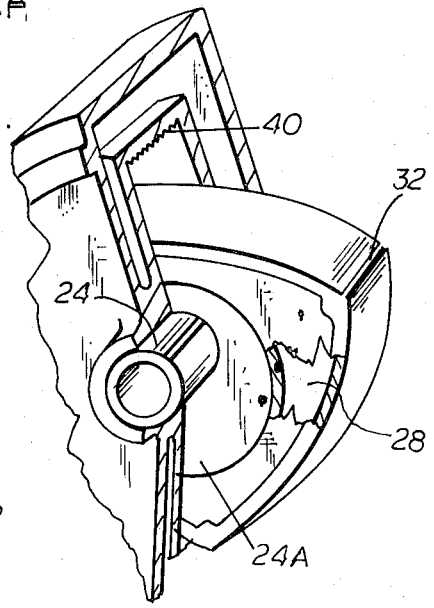
FIG. 5 is a fragmentary view of another embodiment.

Referring to FIG. 5, turbulence which may result from the high velocity fluid emanating from the apex nozzles can be minimized by providing the inner surfaces of the epitrochoidal chamber with a series of circumscribing grooves 40. The grooves 40 thus function to channel the working fluid of the fluid seal in a manner so as to minimize any turbulence thereat. In all other respects the construction of FIG. 5 is similar to that described with respect to either FIGS. 1 or 4.

FIG. 6 illustrates a detailed illustration of the nozzle construction utilized in the apex portion of the engine rotor 23. As shown the nozzle throat 32A is defined as a port opening communicating with the rotor plenum chamber 28. The nozzle then flares or diverges outwardly, as shown, to substantially the entire width of the rotor wherein the discharge or exit opening 32B is defined as a slotted opening exiting the width of the rotor. As shown in the cross-section showings, FIGS. 1 and 2, the width of the discharge opening 32B is divergent or flares outwardly from the throat portion 32A.

From the foregoing it will be apparent that the utilization of the fluid dynamic sealing means described functions to minimize and/or reduce mechanical weal wear at the rotor apexes. Also the co-mingling resulting within the engine housing by the introduction of the lower temperature fluid or compressed air functions to temper the combustion gases to result in reducing overall engine temperatures thus minimizing the problems resulting from uneven heating of the housing. By the resulting lowering of engine temperatures, the amount of objectionable nitrous oxide can be reduced. Also the sealing fluid-compressed air enhances combustion and fuel economy by providing a source of secondary air to more completely consume any unburned hydrocarbons.

While the invention has been described with respect to particular embodiments thereof it will be readily appreciated and understood that variations and modifications may be made without departing from the spirit or scope of the invention.

What is claimed is:

1. A rotary internal combustion engine comprising:

a housing,
    a rotor rotatably journalled within said housing,
    and a fluid dynamic sealing means forming a fluid seal between said housing and said rotor,
    said fluid sealing means comprising a nozzle formed in said rotor,
    and means for directing a fluid through said nozzle at supersonic speed.

2. The invention as defined in claim 1 wherein said nozzle has a throat inlet and a nozzle exit wherein the area of said nozzle exit is greater than the area of said throat inlet and wherein the angle of the nozzle inclined in the direction of rotor rotation is greater than the leaning angle, which is the angle defined between the radius of the rotor and the normal to the inner surface of the housing, and less than 90°.

3. A rotary internal combustion engine comprising:

a housing,
    a rotor rotatably journalled in said housing,
    a fluid dynamic sealing means forming a fluid seal between said housing and said rotor,
    a mechanical seal means formed on said rotor,
    said mechanical seal means and said fluid sealing means defining the sealing means between said rotor and housing,
    said fluid sealing means comprising a nozzle disposed on either side of said mechanical sealing means,
    and means for directing a fluid through said nozzles at supersonic velocities against the inner walls of said housing.

4. A rotary internal combustion engine comprising:

a housing,
    a rotor rotatably journalled in said housing,
    a fluid dynamic sealing means forming a fluid seal between said housing and said rotor,
    a mechanical seal means formed on said rotor,
    said mechanical seal means and said fluid sealing means defining the sealing means between said rotor and housing,
    wherein said fluid sealing means includes a nozzle disposed on one side of said mechanical sealing means,
    and means for directing a fluid through said nozzles at supersonic velocities against the inner walls of said housing.

5. A rotary internal combustion engine comprising:
    a housing having an epitrochoidal chamber, a rotor rotatably journalled within said chamber, said chamber having a fuel intake port and an exhaust port formed therein,
    and said rotor having a plurality of circumferentially spaced apex portions for successively valving said ports as said rotor rotates,
    said rotor defining with said housing a series of operating chambers, said rotor including a plenum chamber, a nozzle formed in each of said apex portions, each of said nozzles being connected into communication with said plenum chamber,
    and means for pressurizing the fluid so as to flow at supersonic velocity through each of said nozzles to form a fluid dynamic seal between said rotor and said housing as said rotor rotates whereby said fluid seal confines the working gases to the respective operating chambers of said rotary engine.

6. The invention as defined in claim 5 wherein each of said nozzles comprises a convergent-divergent nozzle wherein the nozzle exit has an area greater than said nozzle inlet.

7. The invention as defined in claim 5 wherein the angle of inclination of said nozzles that are inclined in the direction of rotor rotation is greater than the leaning angle where the leaning angle is defined as the angle between the radius of the rotor and the line normal to the housing and less than 90°.

8. The invention as defined in claim 7 wherein the velocity of the sealing fluid is at least supersonic at the maximum gap spacing occurring during an engine cycle.

9. A rotary internal combustion engine comprising:

a housing having an epitrochoidal chamber,
a rotor rotatably journalled within said chamber,
said chamber having a fuel intake port and an exhaust port formed therein,
and said rotor having a plurality of circumferentially spaced apex portions for successively valving said ports as said rotor rotates,
and said rotor defining with said housing a series of operating chambers,
said rotor including a plenum chamber,
a nozzle formed in each of said apex portions,
each of said nozzles being connected into communication with said plenum chamber,
and means for pressurizing the fluid so as to flow at supersonic velocity through each of said nozzles to form a fluid dynamic seal between said rotor and said housing as said rotor rotates whereby said fluid seal confines the working gases to the respective operating chambers of said rotary engine wherein said epitrochoidal chamber has grooved surface in which the grooves extend circumferentially of said surface.

* * * * *